United States Patent [19]

Read et al.

[11] Patent Number: 4,594,692

[45] Date of Patent: Jun. 10, 1986

[54] SEISMIC SIGNAL GENERATOR

[75] Inventors: Randol R. Read, Tulsa; John W. Supernaw, Broken Arrow, both of Okla.

[73] Assignee: Standard Oil Company, Chicago, Ill.

[21] Appl. No.: 508,303

[22] Filed: Jun. 27, 1983

[51] Int. Cl.⁴ .......................... G01V 1/22; G01C 17/38
[52] U.S. Cl. .......................................... 367/13; 371/20; 346/33 C; 73/1 DV; 340/514; 340/515; 367/77
[58] Field of Search ...................... 367/13, 76, 77, 133, 367/134; 375/10; 371/20, 24, 25; 346/33 C; 73/1 DV; 364/421, 422; 340/514, 515

[56] References Cited

U.S. PATENT DOCUMENTS

| | | | |
|---|---|---|---|
| 3,719,812 | 3/1973 | Bishop et al. | 375/10 |
| 3,858,170 | 12/1974 | Freeman et al. | 367/13 |
| 3,983,530 | 9/1976 | Johannessen | 367/13 |
| 4,053,890 | 10/1977 | Woodson et al. | 367/13 |
| 4,233,677 | 11/1980 | Brown et al. | 367/15 |
| 4,246,652 | 1/1981 | Khan et al. | 364/421 |
| 4,314,339 | 2/1982 | Kenyon | 364/422 |
| 4,428,076 | 1/1984 | Schuon | 375/10 |
| 4,433,414 | 2/1984 | Carey | 371/25 |
| 4,439,831 | 3/1984 | Sinclair | 364/422 |
| 4,486,862 | 12/1984 | Wyber | 367/13 |

FOREIGN PATENT DOCUMENTS 0783736 11/1980 U.S.S.R. ................................ 367/13

OTHER PUBLICATIONS

Erikson, "Tone-Burst Testing of Pulse-Echo Transducers", 1/79, pp. 7–14, IEEE Trans. on Sonics and Ultrasonics, vol. SU-26, #1.

Carter et al., "Performance of a Multichannel ... Sonar Signals," 9/28/77, pp. 228–229, IEEC & E, Toronto, Canada.

Rankin et al., "Submarine Vibration ... Self Test Feature," 4/30/81, pp. 495–504, IAI, vol. 274 ATM vol. 18, Indianapolis, IN.

Primary Examiner—Nelson Moskowitz
Attorney, Agent, or Firm—Scott H. Brown; Timothy D. Stanley

[57] ABSTRACT

A system for testing seismic signal recording equipment wherein a test signal is generated which simulates the output of at least one seismic sensing device, and, thereafter, the test signal is applied to the seismic signal recording equipment. The test signal is recorded by the seismic signal recording equipment and the recorded signal is compared with the generated test signal to evaluate the performance characteristics of the seismic signal recording equipment. The system can include circuitry to vary component elements of the test signal to test different performance characteristics of the seismic signal recording equipment, as well as ability to generate a random noise signal for addition to the test signal.

14 Claims, 2 Drawing Figures

4,594,692

SEISMIC SIGNAL GENERATOR

BACKGROUND OF THE INVENTION

1. Field of the Invention

The present invention relates to seismic signal recording equipment and, more particularly, to a device to test certain performance characteristics of such seismic signal recording equipment.

2. Setting of the Invention

In seismic prospecting for natural resources, such as for hydrocarbons, an energy impulse is imparted to the earth and the resulting reflected energy signals are detected at the earth's surface by vibration sensing devices, such as geophones and hydrophones. The output of these vibration sensing devices are recorded by seismic signal recording equipment for later processing and interpretation. The seismic signal recording equipment often includes the capability for stacking or "summing" of the recorded signals and/or filtering the recorded signals to remove undesirable noise.

To insure that the seismic signal recording equipment is fully operational, periodic testing operations are initiated. In these testing operations, it is important to be able to test all of the performance characteristics of the seismic signal recording equipment, such as the stacking and the filtering functions stated above. One such way to test the performance characteristics of the seismic signal recording equipment is by an actual seismic source initiation and recording of the seismic signals generated thereby. The recorded seismic signals are thereafter compared with recorded signals obtained by a different recording unit at the same location. This testing procedure is both time consuming and expensive; more importantly, from one seismic initiation to another, the seismic signal can vary so that the seismic signal recording equipment's performance characteristics cannot be tested accurately and in a reproducible manner.

Other testing devices and methods have been developed to test the operability of individual geophones or hydrophones, as well as hydrophone and geophone arrays. Some representative testing methods of this type are illustrated in U.S. Pat. Nos. 4,166,270, 4,366,561, 4,320,468 and 4,184,143. None of the above patents disclose or suggest testing seismic signal recording equipment, nor the testing of performance characteristics of such seismic recording equipment. There exists a need for a testing device capable of testing performance characteristics of seismic signal recording equipment quickly, efficiently and in a reproducible manner.

SUMMARY OF THE INVENTION

The present invention is a system for testing seismic signal recording equipment and which is contemplated to overcome the foregoing disadvantages. In the system of the present invention, a test signal is generated which simulates the output of at least one seismic sensing device, and this test signal is then applied to seismic signal recording equipment where it is recorded. Thereafter, the recorded test signal can be compared to the generated test signal to evaluate the performance characteristics of the seismic signal recording equipment.

The testing system of the present invention can also include a microprocessor for generating the test signal, and can include circuitry so the operator can vary certain elements of the test signal to test different performance characteristics or aspects of the seismic signal recording equipment. The test system of the present invention can include the ability to generate a random noise signal to be added to the test signal.

DETAILED DESCRIPTION OF THE PREFERRED EMBODIMENTS

The present invention is a seismic signal generator used to test seismic signal recording equipment and includes a signal generator to generate a test signal which simulates the output of at least one seismic sensing device, and circuitry for applying the test signal to the seismic signal recording equipment where after the recorded test signal is compared to the test signal for evaluating the characteristics of the recording equipment. For the purposes of this discussion, the term seismic signal recording equipment means any commercially available seismic data recording device, such as tape recorders, seismometer group recorders and the like. Preferably, this seismic signal recording equipment would be those disclosed by U.S. Pat. No. 3,806,864 and pending U.S. application Ser. Nos. 454,405 filed Dec. 29, 1982 and 454,402 filed Dec. 29, 1982, all of which are incorporated herein.

The seismic signal generator of the present invention generates a synthetic test signal which closely approximates the output of at least one seismic sensing device, such as a geophone or a hydrophone. The seismic signal generator generates this signal by a software program, described later, which includes in its logic a seismic simulation equation. One such equation is as follows:

$$S_K(t) = \sum_{j=1}^{n} P_j w(t - t_j) + B_K(t) + R_K(t)$$

where $S_K(t)$ is the signal generated on the Kth simulated source initiation; $B_K(t)$ is burst noise for the Kth initiation; $R_K(t)$ is random noise for the Kth initiation (the characteristics of both the burst and random noise are controllable); $w(t)$ is a seismic wavelet which may be an impulsive type as generated by a dynamite blast or a sweep frequency type; and $(P_j, t_j)$ pairs correspond to reflection coefficients $P_j$ occurring at time $t_j$ on a seismic trace. It should be understood that other seismic signal simulation equations can be utilized within the present invention.

Once a test signal has been generated and thereafter recorded by a seismic signal recording equipment, then the recorded test signal can be compared with the original test signal to enable the operator to determine the performance characteristics of the seismic recording equipment. Seismic signal recording equipment can contain the ability for stacking or "summing" of the seismic data and also for filtering the seismic data to remove unwanted noise elements and the stacking and filtering functions are the type of performance characteristics which are desired to be tested by the present invention.

Figure 1:
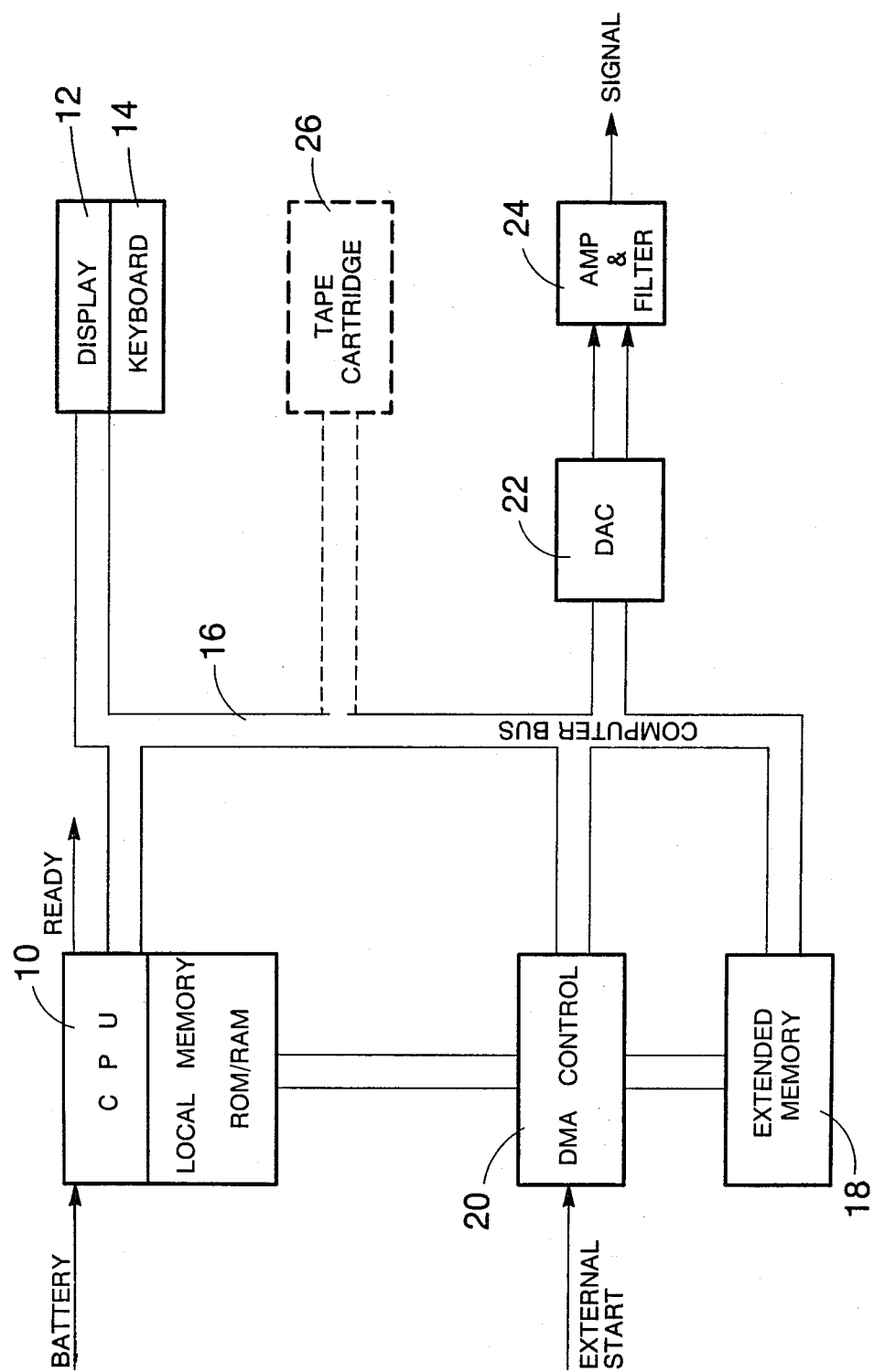
FIG. 1 is a diagrammatic representation of the internal components of the seismic signal generator, embodying the present invention.

To aid in the understanding of the present invention, a description of the hardware will be provided first and a description of the operation of the system will be provided later. As shown in FIG. 1, the seismic signal generator is provided with a central processing unit (CPU) 10, such as a microprocessor, to generate the test signal and to control the operations of the seismic signal generator system. The operational software and signal simulation software is encoded into the Read Only Memory (ROM) of the central processing unit (CPU) 10. The CPU 10 is also connected to a Random Access Memory (RAM) board (not shown) to store a test signal which has been generated for use later, as will be described below.

A visual and/or hardcopy display unit 12 and a keyboard 14 are connected to the CPU 10 via a computer bus 16. The operator of the system can input into the CPU 10 the different parameters from a list provided on the display unit 12 in the seismic signal simulation equation by operation of the keyboard 14.

The seismic signal generator includes an extended memory board(s) and a control board, collectively referred to as a memory control board 18, connected to the CPU 10 via the computer bus 16, and is a storage and retrieval buffer-type location for previously generated test signals or portions thereof. This memory 18 is used in generating very long test signals, such as typical of vibrator-type seismic recording. In conjunction with the extended memory control board 18, is a Direct Memory Access (DMA) circuitry 20 connected to the CPU 10 via the computer bus 16. The test signal outputted to the seismic signal recording equipment is accessed by the DMA 20 independently of the operation of the CPU 10 to generate a new test signal. For example, a test signal which has been generated by the CPU 10 is stored or buffered in the RAM and sent to and stored in one portion of the extended memory control board 18. When the test signal is to be outputted to the seismic signal recording equipment, the DMA 20 accesses the stored test signal in the extended memory control board 18, by operation of the control software within the CPU 10, independently of and possibly concurrently with the generation of a new test signal.

Once the test signal has been accessed by the DMA 20, the test signal is passed through at least one digital to analog signal converter (DAC) to convert the digital test signal to analog format for recording. Preferably, two DAC's 22 are used to increase the dynamic range of the test signal. In one embodiment of the present invention, two conventional 12 bit DAC's 22 are connected in parallel so that the uppermost or most significant bit on one DAC corresponds to the lower or least significant bit on the other DAC. In this manner, a "super" or extended DAC can be created to allow extended analog conversions of both very large and very small signals.

Once the test signal has been sent through the DAC's 22, the two analog test signals are combined into one signal or summed by a summation and filtering board 24. The summation and filter board 24 also acts as a low-pass filter to remove or limit the higher frequency components of the test signal and thereby smooth the test signal before being sent to the seismic signal recording equipment.

In one embodiment of the present invention, a tape reader 26, such as a cassette or reel-type tape reader, can be connected to the CPU 10 via the computer bus 16. By using the tape reader 26, a previously generated and recorded test signal can be input into the extended memory 18 for use as the test signal or for different seismic simulation equations can be input into the CPU 10 for use instead of the equation stored in the ROM of the CPU 10.

The test signal exits the summation and filter board 24 and is received by a seismic signal recording equipment via a direct electrical cable connection.

One of the main considerations in designing the hardware is low power consumption and CMOS logic units are desired. For example, in one embodiment of the present invention, the CPU 10 is a RCA CDP 1805 with 48 kilobytes of memory and the DAC's are two Analog Devices DAC 80's.

Figure 2:
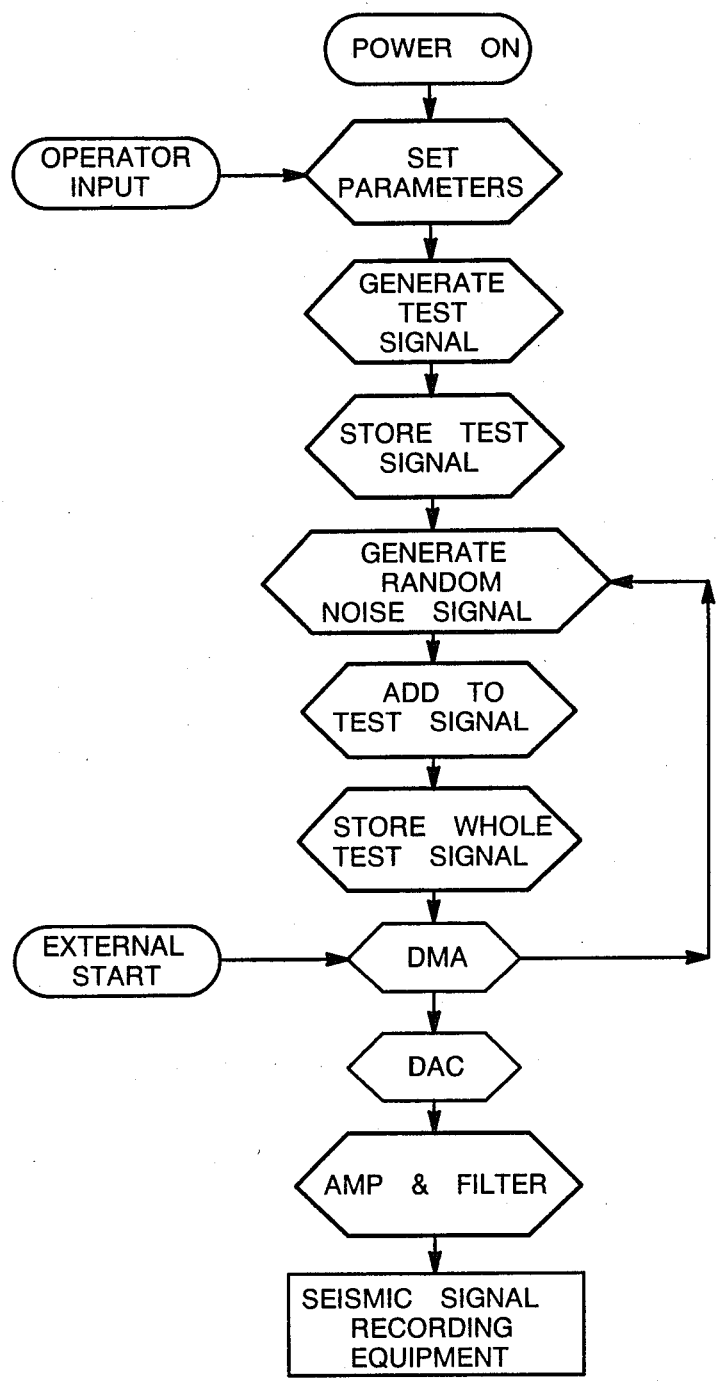
FIG. 2 is a representative flow diagram detailing the operation of the seismic signal generator.

The control of the system starts with initializing the parameters of the test signal equation by use of a list given by the display 12 and input through the keyboard 14. In the embodiment shown in FIG. 2, different equation parameters can be input including the start and end of the sweep frequency, ambient and burst noise levels, and the burst period and width. Other parameters include the record length, pilot length, start and end tapers, sweeps per VP, and time between the sweeps. Another parameter includes the selection of up to eight reflectors, each specified by delay and amplitude. The software inputs all these parameters into the equation and a test signal is generated. Thereafter, a pseudo random noise generator is initialized to generate a random noise signal to be added to the test signal for storage in the extended memory 18. Upon the external start, the DMA 20 is activated which recalls the stored test signal one byte at a time and is sent to the DAC's 20. The DAC's 20 take each byte and then combines 4 bytes at a time to produce the appropriate voltage level for each sample of the signal. The DMA 20 includes a programmable delay after every 4 bytes to control the rate at which data is output to the seismic signal recording equipment, typically one millisecond being sufficient to simulate signals encountered in seismic data. Once the DAC's 22 have converted the 4 bytes into an analog format, then they are sent to the summation amplifier and filter board 24 and then to the seismic signal recording equipment. While the test signal is being retrieved from one portion of the extended memory control board 18, the previously generated signal is retrieved from extended memory and a new random noise signal is generated and these are added and stored in the empty portion of the extended memory control board. In one embodiment of the present invention, the extended memory 18 has 256 kilobytes of memory which is sufficient to store two full 30 second test signals. In this manner, very long signals, such as in 30 second length signals, can be sent to the seismic signal recording equipment while an additional signal is retrieved from memory and the random noise signal added thereto, all of which takes advantage of idle CPU time.

In the field, the seismic signal generator is placed into communication with the seismic signal recording equipment via direct electrical cable connection. The seismic signal generator is then activated by using its own internal power supply (battery pack) or an external power supply, if desired. The operator inputs, via the keyboard 14, into the CPU 10 all of the seismic signal parameters desired. Once all of the user defined parameters have been input into the CPU 10, the test signal is generated and stored internally in extended memory and the random noise signal is generated and added thereto, whereafter the combined signal is stored back in the extended memory 18. The display 12 will then indicate that the seismic signal generator is ready for initiation. In the case of using a seismometer group recorder, such as the type described in U.S. Pat. No. 3,806,864, the seismic signal generator signals a seismometer controller unit that it is ready. The seismometer controller unit then causes the seismic signal recording equipment to activate. Upon this activation of the seismic signal recording equipment, an external start signal from the seismic signal recording equipment is sent to the DMA control 20 which causes the seismic signal generator to output the stored test signal from the extended memory control board 18. Simultaneously, the CPU 10 computes another random noise signal which is added to the stored test signal in extended memory and the new test signal is passed to the empty portion of the extended memory 18. Upon the next activation of the controller of the seismic signal recording equipment, the new test signal is outputted from the extended memory 18 through the DMA 20 and into the seismic signal recording equipment. After the desired number of seismic test signals have been filtered, stacked, and recorded by the seismic signal recording equipment, the recorded signals can be compared with the known test signal, as set up by the operator through the setting of the parameters and using the known simulation equation, to see if indeed the seismic signal recording equipment stacking and filtering circuitry performed adequately.

One application of the seismic signal generator is to test Vibroseis®-type, a trademark of Conoco, field recording equipment. In vibroseis seismic initiations, typically, the signal to noise ratio is less than one, therefore, seismic sweeps are repeated and summed together so the noise will cancel out. One purpose of the seismic signal generator is to have a known test signal recorded and to see to what extent the recording equipment is indeed able to reconstruct the test signal with reduced noise. Usually, the test signal is calculated as a frequency modulated sine wave (swept frequency), starting and ending at a user specified frequency. In this manner, the test signal simulates the signal put out into the ground by the vibrator. For each reflector specified by the user to simulate geometry, the pilot is scaled according to the amplitude of the reflector and added into the composite signal accumulated in memory at a location such that it will appear at the reflection time that was inputted by the user.

There are several other applications for the seismic signal generator including evaluating the summing algorithms, to test the recording equipment to ensure that it is set up and operating properly, and also to compare the summing methods to see which will best operate under a certain type of data.

Whereas the present invention has been described in particular relation to the drawings attached hereto, it should be understood that other and further modifications, apart from those shown or suggested herein, may be made within the scope and the spirit of this invention.

What is claimed is:

1. A system for testing seismic signal recording equipment stacking and filtering performance characteristics, comprising:
   (a) signal generating means for generating a test signal which simulates the response of at least one seismic sensing device to an energy impulse imparted into the earth, the test signal comprising a first component representative of a seismic wavelet and the earth's seismic reflectivity, and the test signal further comprising a second component representative of random noise which simulates the output of at least one seismic sign sensing device; and
   (b) circuitry means for applying the test signal to the seismic recording equipment.

2. The system of claim 1 further including signal generating means for generating a test signal, the test signal further comprising a third component representative of burst noise which simulates the output of at least one seismic signal sensing device.

3. The system of claim 2 further including means for varying elements of the test signal components.

4. The system of claim 2 further including:
   (a) means for generating a second test signal which simulates the response of at least one seismic sensing device to an energy impulse imparted into the earth, the second test signal comprising a first component representative of a seismic wavelet and the earth's seismic reflectivity, and the second test signal further comprising a second component representative of random noise which simulates the output of at least one seismic signal sensing device; and
   (b) circuitry means for applying the second test signal to the seismic signal recording equipment.

5. A system for testing seismic signal recording equipment stacking and filtering performance characteristics, comprising:
   (a) signal generating means for generating a test signal which simulates response to at least one seismic sensing device to an energy impulse imparted into the earth, the test signal comprising a first component representative of a seismic wavelet and the earth's seismic reflectivity, and the test signal further comprising a second component representative of burse noise which simulates the output of at least one seismic sign sensing device; and
   (b) circuitry means for applying the test signal to the seismic signal recording equipment.

6. The system of claim 5 further including signal generating means for generating a test signal, the test signal further comprising a third component representative of random noise which simulates the output of at least one seismic signal sensing device.

7. The system of claim 6 further including means for varying elements of the test signal components.

8. A system for testing seismic signal recording equipment performance characteristics stacking and filtering, comprising:
   (a) signal generating means for generating a test signal which simulates the response of at least one seismic sensing device to an energy impulse imparted into the earth, the test signal comprising a first component representative of a seismic wavelet and the earth's seismic reflectivity, the test signal further comprising a second component representative of random noise, and the test signal further comprising a third component representative of burst noise which simulates the output of at least one seismic signal sensing device; and
   (b) circuitry means for applying the test signal to the seismic signal recording equipment.

9. The system of claim 8 further including means for varying elements of the test signal components.

10. The system of claim 8 wherein the test signal generating means generates an analog test signal according to:

$$S_K(t) = \sum_{j=1}^{n} p_j w(t - t_j) + B_K(t) + R_K(t)$$

where:
- $S_K(t)$ = the analog test signal on the Kth simulated source initiation;
- $B_K(t)$ = burst noise for the Kth simulated source initiation;
- $R_K(t)$ = random noise for the Kth simulated source initiation;
- $w(t)$ = a seismic wavelet; and
- $P_j$ = reflection coefficients at time $t_j$.

11. The system of claim 8 wherein the test signal is adapted to test the performance characteristics of the seismic signal recording equipment including stacking and filtering functions.

12. A method of testing seismic signal recording equipment stacking and filtering performance characteristics, comprising:
   (a) generating a first test signal which simulates the output of at least one seismic sensing device in response to an energy impulse imparted into the earth, wherein the first test signal comprises a first component representative of a seismic wavelet and the earth's seismic reflectivity and a second component representative of noise which simulates the output of at least one seismic signal sensing device;
   (b) applying the first test signal to the seismic signal recording equipment;
   (c) generating a second test signal which simulates the output of at least one seismic sensing device in response to an energy impulse imparted into the earth wherein the second test signal comprises a first component representative of a seismic wavelet and the earth's seismic reflectivity, and a second component representative of noise which simulates the output of at least one seismic signal sensing device; and
   (d) applying the second test signal to the seismic signal recording equipment.

13. The method of claim 12 further including the step of evaluating the stacking and filtering functions of the seismic signal recording equipment to remove the noise components of the first and second test signals.

14. The system of claim 1 and including memory access circuitry means for applying a previously generated test signal to the seismic signal recording equipment while a subsequent test signal is being generated.

* * * * *

UNITED STATES PATENT OFFICE
CERTIFICATE OF CORRECTION

PATENT NO. : 4,594,692
DATED : June 10, 1986
INVENTOR(S) : Randol R. Read and John W. Supernaw It is certified that error appears in the above-identified patent and that said Letters Patent are hereby corrected as shown below:

Column 6, line 1, "sign" should read -- signal --;

line 36, "burse" should read -- burst --;

line 37, "sign" should read -- signal --;

Signed and Sealed this

Nineteenth Day of January, 1988

Attest:

DONALD J. QUIGG

Attesting Officer     Commissioner of Patents and Trademarks